United States Patent [19]

Klinger

[11] Patent Number: 5,181,079
[45] Date of Patent: Jan. 19, 1993

[54] OPTOELECTRONIC MEASUREMENT ARRANGEMENT

[76] Inventor: Dietmar Klinger, Happurger Strasse 4, 8500 Nürnberg 30, Fed. Rep. of Germany

[21] Appl. No.: 646,600
[22] PCT Filed: Aug. 11, 1989
[86] PCT No.: PCT/EP89/00947
  § 371 Date: Jan. 28, 1991
  § 102(e) Date: Jan. 28, 1991
[87] PCT Pub. No.: WO90/02313
  PCT Pub. Date: Mar. 8, 1990

[30] Foreign Application Priority Data
  Aug. 16, 1988 [DE] Fed. Rep. of Germany ....... 3827719

[51] Int. Cl.$^5$ .................. G01B 11/14; G01B 11/03; G01C 3/08
[52] U.S. Cl. ........................ 356/375; 356/152
[58] Field of Search ............... 356/375, 152

[56] References Cited
U.S. PATENT DOCUMENTS

| | | | |
|---|---|---|---|
| 4,330,212 | 5/1982 | Miller | 356/375 |
| 4,923,303 | 5/1990 | Lutz | 356/152 |
| 5,005,979 | 4/1991 | Sontag et al. | 356/375 |

FOREIGN PATENT DOCUMENTS

| | | |
|---|---|---|
| 2149949 | 3/1974 | France . |
| 314403 | 12/1988 | Japan ........................ 356/152 |
| 2005950 | 4/1979 | United Kingdom . |

OTHER PUBLICATIONS

Japanese Patent Abstracts, vol. 10, No. 232, Aug. 12, 1986, patent abstract 61-66911.

Primary Examiner—Richard A. Rosenberger
Attorney, Agent, or Firm—Sughrue, Mion, Zinn, Macpeak and Seas

[57] ABSTRACT

An optoelectronic measurement arrangement (1) for determining the relative positioning of two bodies has light emitters (11, 12, 13) which emit light beams on the first body and a position-sensitive light receiver (3) which measures two dimensions on the second body. The light emitters (11, 12, 13) constitute the corners of a first polygon, for example a triangle, whose paired light beam axes represent different direction vectors which pass through a light receiver (3) and whose points of incidence (31, 32, 33) on the light receiver (3) constitute the corners of a second polygon located inside the light receiver (3). The light emitters (11, 12, 13) are modulated in cyclic on-off sequence and emit pulsed light beams which do not intersect as regards their duration.

7 Claims, 3 Drawing Sheets

OPTOELECTRONIC MEASUREMENT ARRANGEMENT

DESCRIPTION

The invention relates to an optoelectronic measurement arrangement for determining the relative position of two bodies to each other.

An optoelectronic measurement arrangement is known from DE-PS 33 14 089 for determining the relative position of two bodies to each the other, with light emitters, from which light beams emanate, at the first body and position-sensitive, two-dimensionally measuring light receivers at the second body, on which the light beams impinge, wherein signal pairs, which represent the relative translation and/or rotation and from which the relative position of the two bodies to each other is derivable, are produced by the light receivers from the position of the points of incidence and the beam axes. This measurement arrangement, however, suffers from the disadvantage that it requires three two-dimensionally measuring light receivers. Since two-dimensionally measuring light receivers are expensive components, the entire measurement arrangement is thereby greatly impaired in its economy.

In printed specification FR-A 2 194 949 (Selcom) it is described how the images of several punctiform light sources on an areal diode are distinguishable by a different modulation of the individual light sources. As examples for the application of the modulated light sources, however, there are mentioned only examples which all have the object of observation of the time course of movement processes, such as, for example, a golf track, a jump or the beginning or a 100 meter run. However, no reference is to be found anywhere in the specification that the light points emitting modulated light together with the receiver shall serve for technical measurement determination of the relative position of two bodies.

Partial calculations for the relative position of two systems are carried out in specification GB-A-2 005 950 (HAY). Auxiliary computations are performed by a camera and further arrangement in order that, for example, a tunnel-drilling machine maintains its straight course. Measurement technique by way of a wide angle objective of a camera represents an imprecise measurement. A calculation of the relative position of two systems in six degrees of freedom is not described. The points in the target planes are defined by light-emitting diodes, which are operated in sequence by switches.

The invention is therefore based on the task of providing an optoelectronic measurement arrangement which enables the relative position of two bodies to be determined in their six degrees of freedom with the least possible number of light receivers.

According to the invention this task is solved as indicated in patent claim 1. Developments of the invention are described in dependent patent claims 2 to 7.

Embodiments of the invention are illustrated in the drawings, in which.

Figure 1:
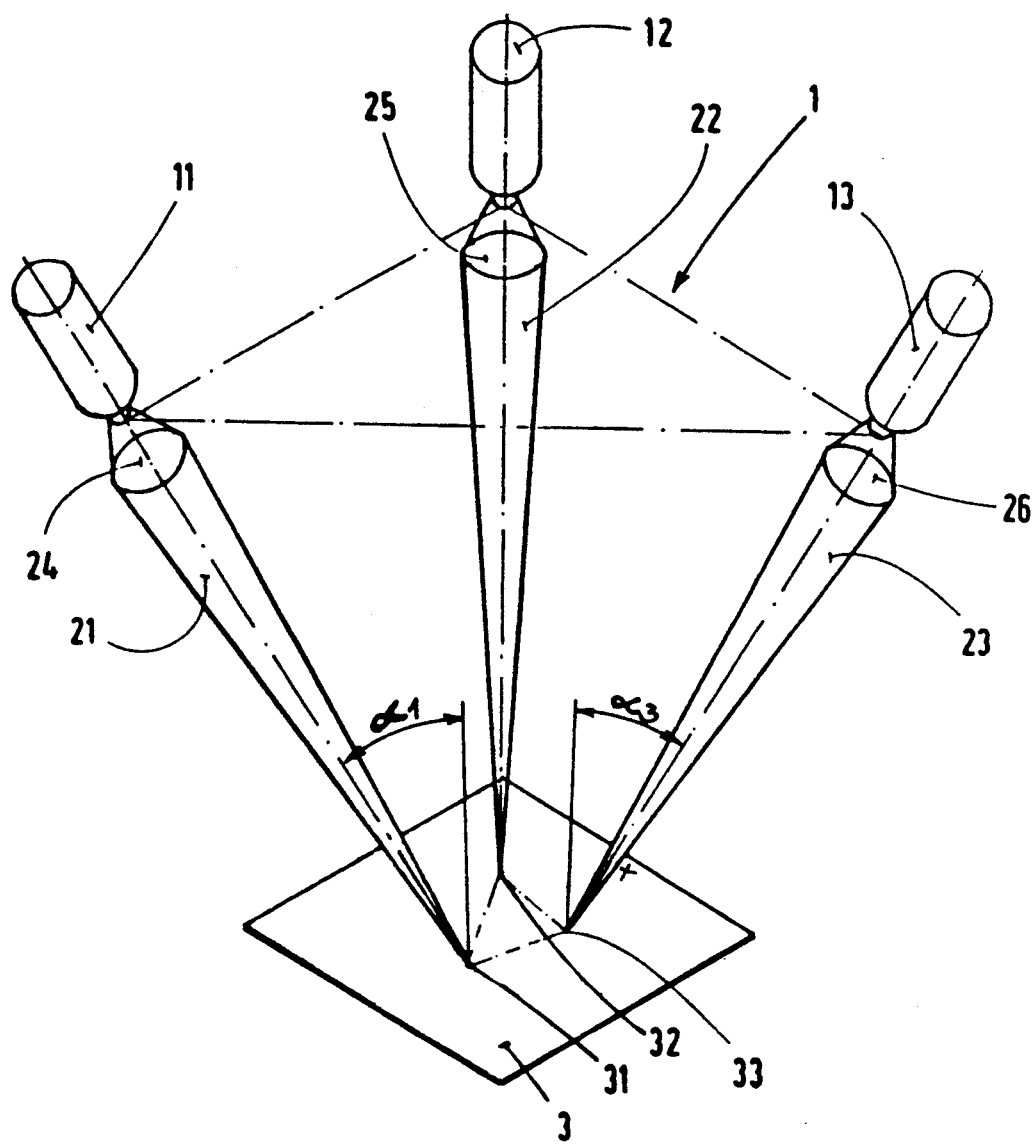
FIG. 1 shows a basic representation of light emitters and light receiver.

An optoelectronic measurement arrangement 1 is schematically illustrated in FIG. 1. The measurement arrangement 1 consists of, for example, three light emitters 11, 12 and 13, which are arranged at the first body and from which light beams 21, 22 and 23 emanate, and a position-sensitive, two-dimensionally measuring light receiver 3 at the second body. The light beams 21, 22 and 23 are concentrated by, for example, optical systems 24, 25 and 26 onto the light receiver 3. The light emitters 11, 12 and 13 arranged at the first body form the corner points of a first triangle.

The axes of the light beams 21, 22 and 23 represent in pairs, different direction vectors and respectively intersect the light receiver 3 at different angles, for example the three angles $\alpha 1$, $\alpha 2$ and $\alpha 3$. For graphical reasons, it is not possible in FIG. 1 to draw in the angle $\alpha 2$. The points of incidence 31, 32 and 33 of the light beams 21, 22 and 23 form a second triangle on the light receiver 3. Through the use of more than three light sources, respective polygons are present instead of the two triangles.

The measurement is now carried out with the afore-described basic measurement arrangement in such a manner that the light emitters 11, 12 and 13 emit light beam pulses which are modulated on-off in rotating sequence and do not overlap in their time lengths. Thereby, the respective coordinates x and y of the three points of incidence 31, 32 and 33 can be individually determined one after the other. The relative positional change of the two bodies to each other results unequivocally from the ratio of a zero or reference measurement to an actual measurement. If more than three light emitters are used, the afore-described measurements can then be performed with three of these light emitters each time and the results can be compared with each other and checked against one another. If it is evident in this case that a value significantly differs from the remaining results, which, for example, can be the case when two light points of a light point triangle 31, 32 and 33 lie too closely together or all three light points 31, 32 and 33 lie on a straight line, then this value is discarded. Thus, the security and the accuracy of the measurement can be appreciably increased.

For production of the light beams 21, 22 and 23, preferably lasers, laser diodes, light-emitting diodes or other light sources can be used, the light of which is guided through optical conductors, optical systems or the like.

Figure 2:
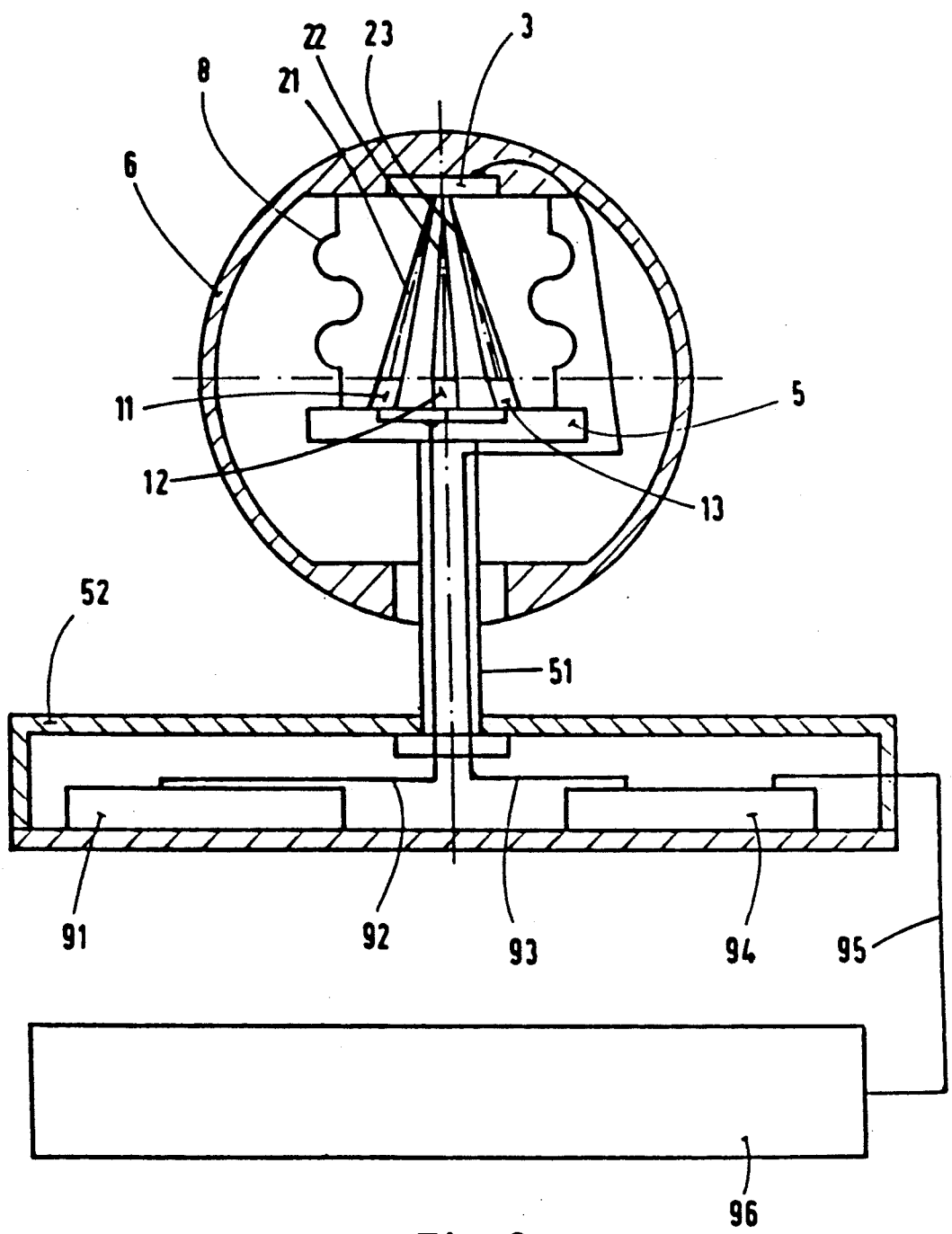
FIG. 2 shows a perpendicular section through a joystick.

A control handle 4 of a multi-dimensional joystick is illustrated in FIG. 2 as first example of application. The control handle 4 consists of the base body 5 and the handle member (handle) 6. The base body 5 is mounted on a pedestal 52 by way of a shank 51. The three light emitters 11, 12 and 13, which project their light beams 21 and 23 onto the light receiver 3, are disposed on the upper side of the base body 1. The line 92 leads through the hollow shank 51 from the electronic transmitting system 91 to the light emitters 11, 12 and 13 and the line 33 through the hollow shank 51 from the light receiver 3 to the electronic receiving system 94. The light emitters 11, 12 and 13 and the light receiver 3 are enveloped by an elastic element, preferably a spring bellows 61. At the same time, a mutual zero position is fixed by the spring bellows 61. The spring bellows 61 at the same time also forms a dustproof and watertight envelope.

The light receiver 3 can be a quadrant, matrix or lateral effect diode or a charge-coupled device receiver.

The afore-described control handle 4 permits a control with six degrees of freedom, as the handle member 6 is movable three-dimensionally relative to the base body 5 and thus has three degrees of freedom for translation and three degrees of freedom for rotation. These six dimensions are usable for the control of a manipulating device with six or fewer degrees of freedom. If, however, the degrees of freedom are used in only one plane, namely two degrees of freedom for the translation and one degree of freedom for the rotation, then a cursor on an image screen can be displaced or a cursor-like arrow can be displaced and/or rotated thereby. Its possibilities of use thus go beyond that of a "mouse", by which a cursor is merely displaceable on the image screen.

Figure 3:
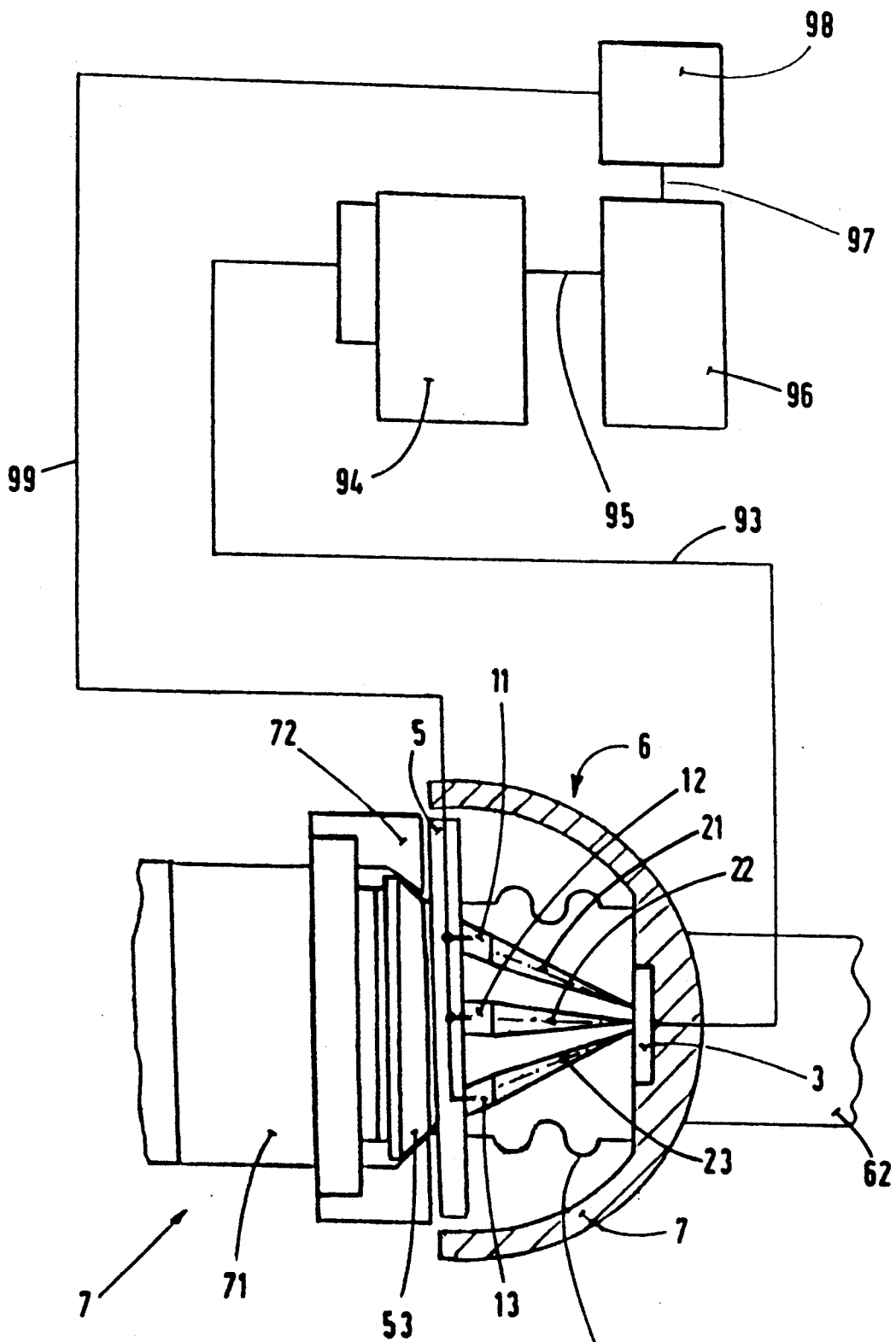
FIG. 3 shows a partial section through a manipulating device.

A simplified representation of a manipulating device 7 is illustrated in FIG. 3 as second example of application. In this case, a handle member 6 of fixed location is present, which is mounted in fixed location by a fastening carrier 62. The handle member 6 consists of an approximately hemispherical shell, in which the light receiver 3 is mounted. The circular base body 5 carries the light emitters 11, 12 and 13, which project light beams 21, 22 and 23 onto the light receiver 3. The base body 5 is elastically mounted on the handle member 6 by the spring bellows 61. A flange 53 is fastened to the base body 5. Disposed on an arm of the manipulating device 7 is the coupling 71 with grippers 72, which when coupled on encompass the flange 53 and thereby bring the system into measuring position.

The control of the light emitters 11, 12 and 13 as illustrated in FIG. 2 takes place through an electronic transmitting system 91, which is connected by a line 92 with the light emitters 11, 12 and 13 and modulates these on-off. According to FIG. 2 and FIG. 3, the reception signals of the light receiver 3 are conducted by the receiving line 93 to an electronic receiving system 94, which is connected by way of a line 95 to a computer interface with an evaluating computer 96.

In FIG. 3, a line 97 between the computer and the control unit then feeds the computed values to a control unit 98, which in its turn controls the manipulating device 7 by way of the line 99.

I claim:

1. Optoelectronic measurement means for determining the position of two bodies relative to each other, comprising a first body, at least three light emitters arranged on the first body at the corner points of a notional polygon and operable to emit light beams, wherein the light beam axes of the light emitters represent, in pairs, different direction vectors, a control unit comprising electronic transmitting means to modulate the light emitters on-off in rotating sequence so that the emitters emit light pulses not overlapping in their time length, a second body, a position-sensitive two-dimensionally measuring light receiver arranged at the second body to receive the light beams and operable to generate, in dependence on the position of the points of incidence of the beams on the receiver and the beam axes, signal pairs representing at least one of relative translation and relative rotation of the two bodies, and means to determine the relative position of the two bodies from the signal pairs.

2. Measurement means according to claim 1, wherein the second body encloses the first body, the light emitters and the light receiver.

3. Measurement means according to claim 2, comprising a resilient element interconnecting the first body and the second body.

4. Measurement means according to claim 3, wherein the resilient element is a spring bellows which dust-tightly and watertightly encloses the light emitters and the light receiver.

5. Measurement means according to claim 1, wherein the light receiver is selected from the group consisting of a quadrant diode, a matrix diode, a lateral effect diode and a charge-coupled-device receiver.

6. Measurement means according to claim 1, wherein one of the two bodies comprises a handle and the other one of the two bodies is disposed in a fixed location.

7. Measurement means according to claim 1, comprising means to apply the signal pairs for control of one of a manipulating device and a three-dimensional graphic system on an image screen.

* * * * *